J. HOLTZMAN.

GAS BURNER VALVE AND LIGHTER.

Reissued Feb. 10, 1914. 13,685.

APPLICATION FILED OCT. 20, 1913.

Witnesses:
Chas. W. LaRue
S. Goodman

Inventor
John Holtzman
By his Attorney
Benjamin Coman

UNITED STATES PATENT OFFICE.

JOHN HOLTZMAN, OF NEW YORK, N. Y., ASSIGNOR OF ONE-HALF TO JOSEPH LISKEN, OF NEW YORK, N. Y.

GAS-BURNER VALVE AND LIGHTER.

13,685. Specification of Reissued Letters Patent. Reissued Feb. 10, 1914.

Original No. 1,072,615, dated September 9, 1913, Serial No. 758,095. Application for reissue filed October 20, 1913. Serial No. 796,372.

*To all whom it may concern:*

Be it known that I, JOHN HOLTZMAN, a resident of the city of New York, in the county of New York and State of New York, have invented certain new and useful Improvements in Gas-Burner Valves and Lighters, of which the following is a specification.

This invention relates to gas burning devices, and particularly to those used for illuminating purposes.

In gas jets, burners, stoves, etc., it happens that the valve is accidentally or unknowingly opened, which causes escape of gas, and sometimes explosion and suffocation.

The principal object of my invention is to provide simple and improved means, operated by the gas valve, for automatically lighting the gas without the use of matches, and for preventing the aforesaid accidents.

Other objects and advantages will hereinafter appear.

Figure 2:
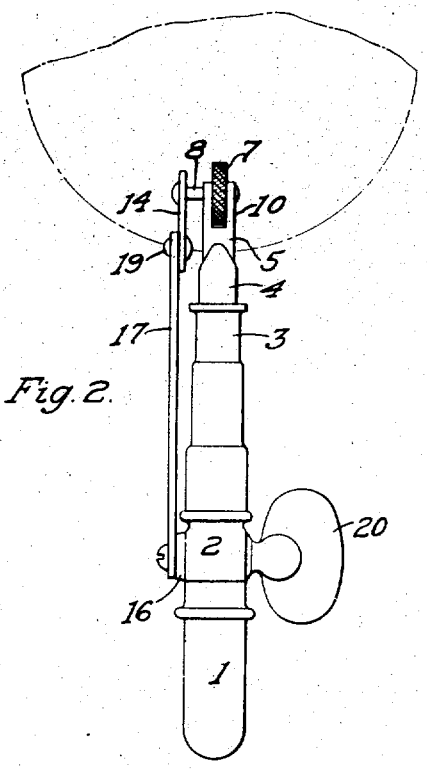
Figure 1:
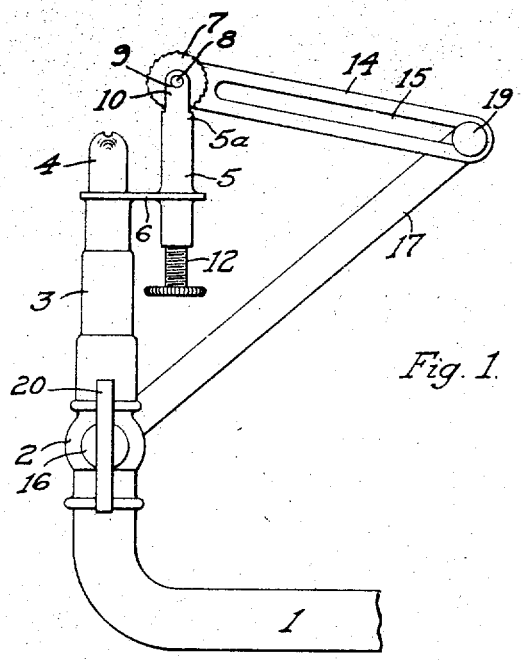
Figure 3:
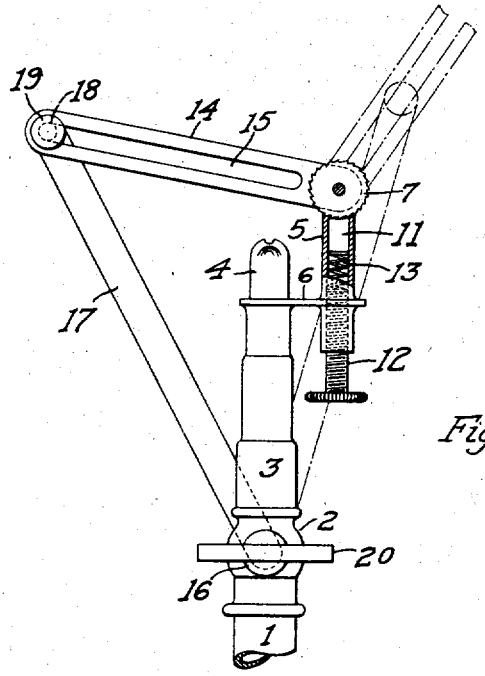

In the accompanying drawings, Figure 1 is a general elevation of a gas jet and the improvements, and shows the position of the device when the valve is turned on and the gas burns. Fig. 2 is a side view of Fig. 1. Fig. 3 is an elevation similar to Fig. 1, and shows the position of the device when the valve is closed and the light out.

A gas-jet, such as usually employed for illumination, for which the invention is here shown as adapted, comprises the extremity of a gas pipe 1 leading from the main, a cock or valve 2 for turning the gas on and off, a burner 3, and a gas tip 4 for producing the proper flame. A tube 5 is secured adjacent the jet to a bracket 6 attached to the burner 3, and a steel abrading wheel 7 is rotatably mounted at the upper extremity $5^a$ of said tube by means of the wheel-shaft 8 running in bearings 9 of ears 10 forming part of the tube. Within the upper part of tube 5 is disposed a block 11 of sparking material, such as a cerium and iron alloy or other suitable compound which will emit sparks when abraded by steel. A thumb screw 12 threads into the lower part of tube 5, and a spring 13 is located between the extremity of said screw and block 11, whereby it presses against the block and forces it to bear continually against the milled or toothed periphery of wheel 7, so that a sudden rotation of said wheel in a clockwise direction, as viewed in the drawing, will cause a shower of sparks to be emitted directly above the gas-tip 4.

Upon the shaft 8 is secured an arm 14 provided with a longitudinal slot 15, and to the end of the valve-barrel 16 is secured a lever 17. The opposite end of lever 17 engages the arm 14, by means of a pin 18 thereon fitting within the slot 15 and being provided with round heads 19 at each end to guide the arm and lever. Therefore, when the valve 2 is turned by its thumb-wing 20 from its closed position in Fig. 3 to its open position in Fig. 1, the lever 17 is actuated and the arm 14 caused to swing in a clockwise direction from the position in Fig. 3 to that in Fig. 1, whereby the gas is turned on and said wheel is rotated to emit sparks and ignite the gas. When the valve is turned back and the gas shut off, said lever and arm are restored to the position shown in Fig. 3. In the open position of the valve the lever 17 and arm 14 are disposed away from the gas flame, as indicated by the dot and dash lines, Fig. 2, so that said parts do not interfere with the light.

It will be noted that block 11 being pressed by spring 13 against wheel 7 offers resistance to the swinging of lever 17 and arm 14 and consequently to the turning in either direction of the valve 2. Said resistance is least when the arm 14 is at the commencement of its stroke, Fig. 3, due to the pin 18 being farthest from the wheel 7 and the leverage thereat greatest, and increases as the arm approaches its midway position, shown by the dot and dash lines, Fig. 3. At this point the leverage is shortest and resistance greatest, and as the arm 14 approaches the opposite end of its stroke, Fig. 1, said resistance diminishes steadily. This action brakes the valve 2, which commences to turn with ease, and when midway turns difficultly, and then completes its stroke with an abrupt and sudden snap movement. The wheel 7 is thus rotated suddenly by the snap action of the valve, whereby it emits a large shower of sparks to light the gas when it is turned on. Said snap action making it comparatively difficult to turn the wing 20 when the valve is in midway position, just prior to letting the gas out, prevents accidental opening of the valve if an unforseen object happens to brush against said wing, and accident due to escape of gas is thereby prevented. Should however the valve be opened at any time, without intention, it would cause the gas to light and thereby prevent its free escape and the consequent dangers. The pin 18 abutting against the extremity of slot 15 prevents further rotation of the valve 2 when it is set to either of its positions.

Variations may be resorted to within the scope of the invention, and portions of the improvements may be used without others.

Having thus described my invention, I claim:

1. The combination with a gas burner, and a valve therefor, of a gas lighting device adjacent said burner, said device including a spark producing abrading wheel, a slotted arm fixed to said wheel adaptable to rotate it for lighting the gas, a lever fixed to said valve engaging said arm, and said lever and arm being actuated to light the gas when turned on by said valve.

2. The combination with a gas jet, and a valve therefor, of a tube adjacent said jet, an abrading wheel mounted on said tube, a spring-pressed sparking compound within said tube bearing against said wheel, a slotted arm fixed to said wheel, and a lever fulcrumed on said valve engaging the slot in said arm, said valve actuating said lever and arm to rotate said wheel for lighting the gas and to impart a snap movement thereto when opened and closed.

3. The combination with a gas burner, and a valve therefor, of a gas lighting device adjacent said burner, said device including a spark producing abrading wheel, an arm fixed to said wheel adaptable to rotate it for lighting the gas, a lever fixed to said valve engaging said arm, and said lever and arm being actuated to light the gas when turned on by said valve.

4. The combination with a gas burner, and a valve therefor, of a gas lighting device adjacent said burner, said device including a spark producing abrading wheel, an arm fixed to said wheel adaptable to rotate it, a lever connected to said valve and to said arm being actuated by the former to swing the latter for lighting the gas when turned on by said valve, and said arm being adaptable to guide the connecting end of said lever therealong.

JOHN HOLTZMAN.

Witnesses:
CHAS. W. LA RUE,
B. ROMAN.